April 18, 1939.  F. V. LONG  2,154,760
FLOAT
Filed Aug. 31, 1937
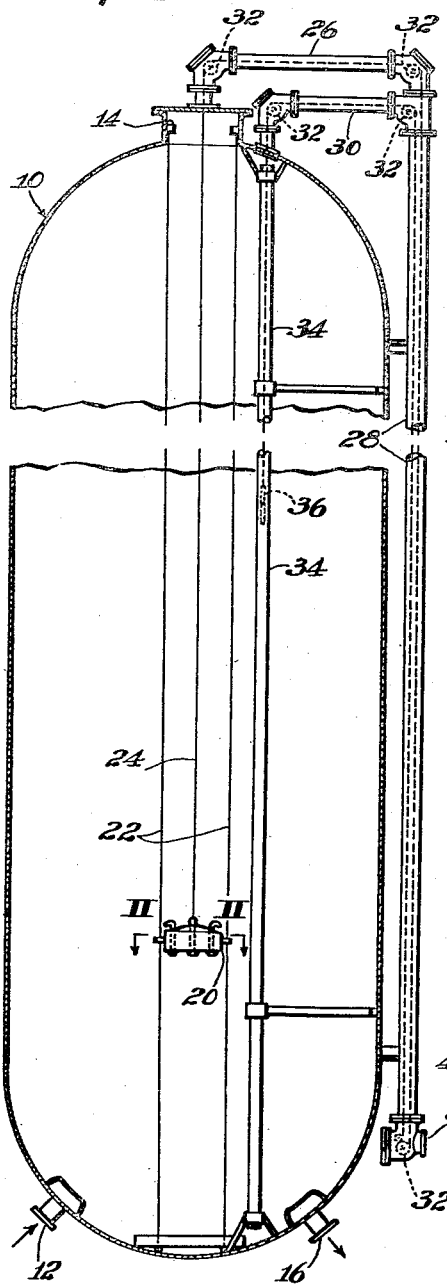
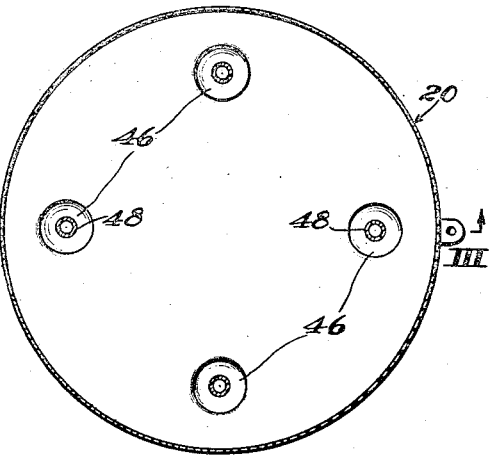
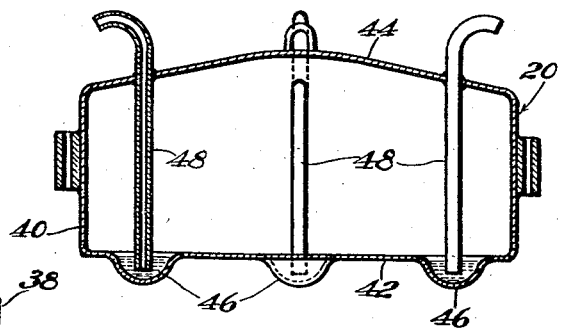
WITNESSES
A.B.Wallace.
A.H.Oldham
INVENTOR.
Frank V. Long
BY Brown, Critchlow & Flick
his ATTORNEYS.

Patented Apr. 18, 1939

2,154,760

UNITED STATES PATENT OFFICE 2,154,760

FLOAT

Frank V. Long, Los Angeles, Calif.

Application August 31, 1937, Serial No. 161,723

1 Claim. (Cl. 137—104)

This invention relates to floats and particularly to floats for gauges such as are employed to indicate the depth of liquid in a tank.

Heretofore various types of floats have been employed for tank gauges and while there is no great problem in providing a satisfactory float for use in tanks operating at atmospheric pressure or slightly above or below atmospheric pressure, difficulty has long been experienced in providing a satisfactory float for use with tanks contai..ing liquid at relatively high and varying pressures. This is due to the fact that if the floats are made hollow the pressure either crushes the float or tends to cause leakage which impairs the accurate operation of the float. One form of float which is now employed includes a plurality of relatively small tubes which are nested together and sealed at their ends. With this type of float the pressure and often the corrosive action of the liquid being measured causes leakage of one or more of the tubes, thereby changing the level of the float and preventing accurate measurement by the float of the level of liquid in the tank. Again I have found that in the use of floats for measuring the level of a liquid in a tank under high pressure the float may be cru hed against the top of the tank or may collapse in the tank due to the high pressure.

It has also been proposed in the past to provide a boat-type float open to the atmosphere within the tank, but such floats are of undesirably large size and have been found to be inaccurate because of the collection of liquid in the open float.

It is the general object of my invention to avoid and overcome the foregoing and other difficulties of known floats by the provision of an improved float for tank gauges, or the like, which float is of relatively small size and yet which is capable of operating in tanks of varying and high pressures and which will maintain its accuracy substantially for the life of the tank without inspection or repair.

Another object of my invention is the provision of an improved gauge float which is relatively inexpensive and which can be readily installed in a tank and which is unaffected by pressure.

Another object of my invention is to provide a float which is self-bailing or self-"puking" to discharge any liquid therefrom and which can be self-operating at relatively small pressure changes.

The foregoing and other objects of my invention are achieved by the provision of an improved float which utilizes the principles of Charles' and Boyle's laws on the volume of gases. Specifically my improved float is hollow and open to external pressure but includes means for collecting any liquid present in the float due to condensation or otherwise. Associated with the means for collecting the liquid in the float are means for discharging the liquid from the float upon the reduction of the pressure outside the float. When incorporated in a tank for gauge purposes, means are provided for guiding the float in vertical movement and other means for indicating the position of the float in the tank.

For a better understanding of my invention reference should be had to the accompanying drawing wherein Fig. 1 is a vertical cross-sectional view of a tank having a float gauge associated therewith incorporating the features of my invention; Fig. 2 is a horizontal cross-sectional view of the float as taken on line II—II of Fig. 1 and on enlarged scale; and Fig. 3 is a vertical cross-sectional view taken on line III—III of Fig. 2.

While the principles of my invention are broadly applicable to the manufacture of floats of various kinds and capable of use in many relations, they are particularly beneficial in the provision of a float forming a part of a gauge for measuring the level of liquid in a tank. Accordingly, my invention has been illustrated in conjunction with a tank and will be so described, particularly inasmuch as the float in the combination illustrated and described provides an improved tank gauge.

Referring to Fig. 1, the numeral 10 indicates generally a metal tank having an inlet 12, a manhole 14 and an outlet 16. Positioned within the tank 10 is a float 20 which has guided vertical movement in the tank as by the provision of guide wires 22 which extend through suitable eyes fastened to the sides of the float 20. The float is connected to an indicating tape 24 which extends to the outside of the tank for reading purposes. This may be accomplished by the provision of a pipe 26 connected to the manhole 14, a vertical pipe 28 and a return pipe 30 extending through the tank near the manhole 14. The tape 24 extends over suitable shives 32 carried by the several pipes and then extends back into the inside of the tank and into a vertical pipe 34. A counterweight 36 secured to the end of the tape maintains it taut over the various shives so that as the float 20 rises or falls in accordance with the rise or fall of the liquid in the tank, the tape 24 moves through the pipes 26, 28, 30 and 34 under the force of the counterweight 36. The lower end of the vertical pipe 26 is provided with one or more glass windows 38 whereby the markings on the tape 24 can be read to determine the level of the liquid in the tank.

The float, indicated as a whole by the numeral 20 and above generally described in combination, ordinarily comprises a relatively short cylindrical body portion 40 having a bottom 42 and a top 44 forming a closed hollow container. The bottom 42 of the float 20 is preferably formed with means for collecting any liquid present in the float due to condensation or otherwise. This means may take any of a plurality of forms but has been illustrated as comprising a plurality, usually four, of sumps 46 which merely comprise recesses or depressions in the bottom 42 in which any liquid contained in the float is trapped or to which the liquid flows. Each sump 46 has associated therewith and extending to its bottom a conduit 48 having a relatively small bore and extending from the sump out through the float above the level of the liquid supporting the float. On a float of short vertical height the conduits 48 conveniently extend through the top of the float as illustrated. Where, however, the float must be made vertically high and horizontally narrow, as is the case in certain installations as, for example, in a tank having a small manhole or opening, the conduits 48 may be run out the sides of the float above the line of the supporting liquid. It should also be noted that with a vertically high and horizontally narrow float sumps 46 may be dispensed with and the conduits 48 run down to almost touch the bottom of the float.

It will be seen that in the operation of the float 20 the conduits 48 actually make the interior of the float open to the atmosphere inside the tank. Thus when the pressure for any reason is materially increased in the tank, air or other gas within the tank and positioned above the liquid flows into the inside of the float by way of the conduits 48. Any vapor in the gas thus flowing into the inside of the float may condense within the float, which if not removed would eventually change the accuracy of the float. However, when the liquid does condense within the float or is present therein for any other reason, it flows into the sumps 46 and thereafter when the pressure outside the float drops, the greater pressure within the float, in accordance with Boyle's and Charles' laws, forces the liquid out through the conduits 48 so that the liquid is discharged back into the liquid in the tank. In this manner the float is self-bailing and its buoyancy is maintained the same over long periods of use without inspection so that its accuracy is always uniform.

It will be recognized that the height of the conduits 48 determines the pressure differential which will operate to discharge any given liquid from the float. Assuming the tank contains water under an absolute pressure of 100 lb./sq. in. and that some of the water has gotten in the float, then the pressure in the float will also be 100 lb./sq. in. absolute. Now, if the conduit is 3 inches high a drop in pressure outside the float of less than 8 oz. forces any liquid having a specific gravity of less than one out of the conduits 48. Thus any float used in any liquid can quickly be calculated to determine the pressure drop required to effect self-bailing or "puking."

The volume of the sump or sumps, if any are used, effects the self-bailing operation of the float and the pressure drop inside the float upon the discharge of liquid from the inside of the float, as will be evident. Although the size of the sump or sumps can be widely varied and their use even dispensed with while retaining many of the advantages of my invention, I preferably make the total volume of the sump or sumps equal to between about $1/25$ and about $1/150$ of the volume of the float, and usually about $1/80$ of the volume of the float. The sump or sumps are preferably of curved cross-section and the conduits 48 preferably extend almost completely to the bottom thereof so that liquid standing in the sump is forced out the conduit when the pressure inside the float is greater than that outside, but so that when the pressure outside the float is greatest fluid or gas can flow in through the conduits to balance the pressure inside and outside the float, all as above explained.

From the foregoing it will be recognized that the objects of my invention have been achieved by the provision of an improved float which is relatively small in size and inexpensive to manufacture and which can be readily installed in a tank and which operates accurately over long periods without repair. This is due to the fact that the float is open to the atmosphere within the tank so that changes in pressure in the tank do not tend to collapse the float and yet any liquid deposited in the float by condensation or otherwise is continuously and automatically removed so that as a result the buoyancy of the float is maintained uniform and the gauge associated therewith is extremely accurate.

While in accordance with the patent statutes I have specifically illustrated and described one particular embodiment of my invention, it should be understood that I am not to be limited thereto or thereby since my invention is defined in the appended claim.

I claim:

A float for a tank gauge or the like comprising a closed hollow body having a substantially flat bottom, sumps formed at spaced points in the bottom of the body and extending below the plane thereof and adapted to collect any liquid in the body, and conduits extending from the sumps to the outside of the float through the top of the body.

FRANK V. LONG.